(12) United States Patent
Feraud

(10) Patent No.: US 9,404,568 B2
(45) Date of Patent: Aug. 2, 2016

(54) EPICYCLIC REDUCTION GEAR, NOTABLY FOR A TURBOMACHINE

(71) Applicant: HISPANO-SUIZA, Colombes (FR)

(72) Inventor: Benjamin Feraud, Rueil Malmaison (FR)

(73) Assignee: HISPANO-SUIZA, Colombes (FR)

( * ) Notice: Subject to any disclaimer, the term of this patent is extended or adjusted under 35 U.S.C. 154(b) by 0 days.

(21) Appl. No.: 14/425,446

(22) PCT Filed: Aug. 29, 2013

(86) PCT No.: PCT/FR2013/051992
§ 371 (c)(1),
(2) Date: Mar. 3, 2015

(87) PCT Pub. No.: WO2014/037652
PCT Pub. Date: Mar. 13, 2014

(65) Prior Publication Data
US 2015/0252889 A1  Sep. 10, 2015

(30) Foreign Application Priority Data

Sep. 4, 2012 (FR) ..................................... 12 58230

(51) Int. Cl.
*F16H 57/04* (2010.01)
*F02C 7/36* (2006.01)
*F16H 57/08* (2006.01)

(52) U.S. Cl.
CPC .............. *F16H 57/0479* (2013.01); *F02C 7/36* (2013.01); *F16H 57/045* (2013.01); *F16H 57/0442* (2013.01); *F16H 57/0486* (2013.01); *F16H 57/082* (2013.01); *F05D 2260/40311* (2013.01); *F16H 2057/085* (2013.01)

(58) Field of Classification Search
None
See application file for complete search history.

(56) References Cited

U.S. PATENT DOCUMENTS

| 3,469,656 | A | | 9/1969 | Benthake et al. | |
| 4,271,928 | A | | 6/1981 | Northern | |
| 5,472,383 | A | * | 12/1995 | McKibbin | ........... F16H 57/0482 184/6.12 |

(Continued)

OTHER PUBLICATIONS

International Search Report Issued Nov. 25, 2013 in PCT/FR13/051992 Filed Aug. 29, 2013.
U.S. Appl. No. 14/423,931, filed Feb. 25, 2015, Feraud, et al.

*Primary Examiner* — Dirk Wright
(74) *Attorney, Agent, or Firm* — Oblon, McClelland, Maier & Neustadt, L.L.P.

(57) ABSTRACT

An epicyclic reduction gear, for example for a turbomachine, including an internal sun gear and an external sun gear, which are coaxial, with the internal sun gear being movable in rotation about its axis, with the external sun gear being stationary. At least one planet gear is mounted to be movable in rotation on a planet carrier and meshing with both the internal sun gear and the external sun gear. The planet carrier is configured to pivot about the axis of the internal sun gear and the external sun gear, the planet gear having a cylindrical inner surface mounted to be movable in rotation around a cylindrical surface of the planet carrier. The reduction gear further includes a mechanism supplying oil at an interface between the cylindrical surfaces.

10 Claims, 4 Drawing Sheets

(56) References Cited

U.S. PATENT DOCUMENTS

| | | | | |
|---|---|---|---|---|
| 7,931,556 B2* | 4/2011 | Diosi | ............... | F16H 57/0482 475/116 |
| 8,215,454 B2* | 7/2012 | Portlock | ............... | F01D 25/18 184/6.11 |
| 2013/0319006 A1* | 12/2013 | Parnin | ............... | F01D 25/18 60/805 |
| 2013/0324343 A1* | 12/2013 | Gallet | ............... | F02C 3/107 475/159 |
| 2015/0072825 A1* | 3/2015 | DiMatteo | ............... | F16H 57/0479 475/159 |
| 2015/0192199 A1* | 7/2015 | Feraud | ............... | F16H 57/0442 475/159 |
| 2015/0252889 A1* | 9/2015 | Feraud | ............... | F16H 57/0442 475/159 |

* cited by examiner

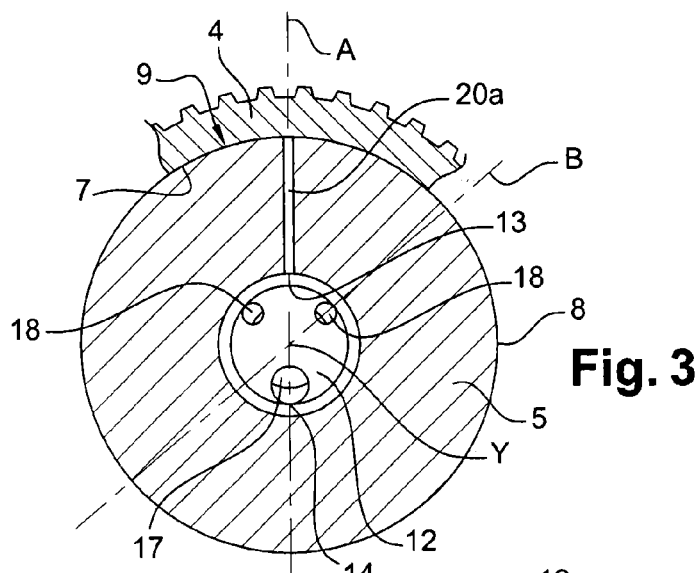
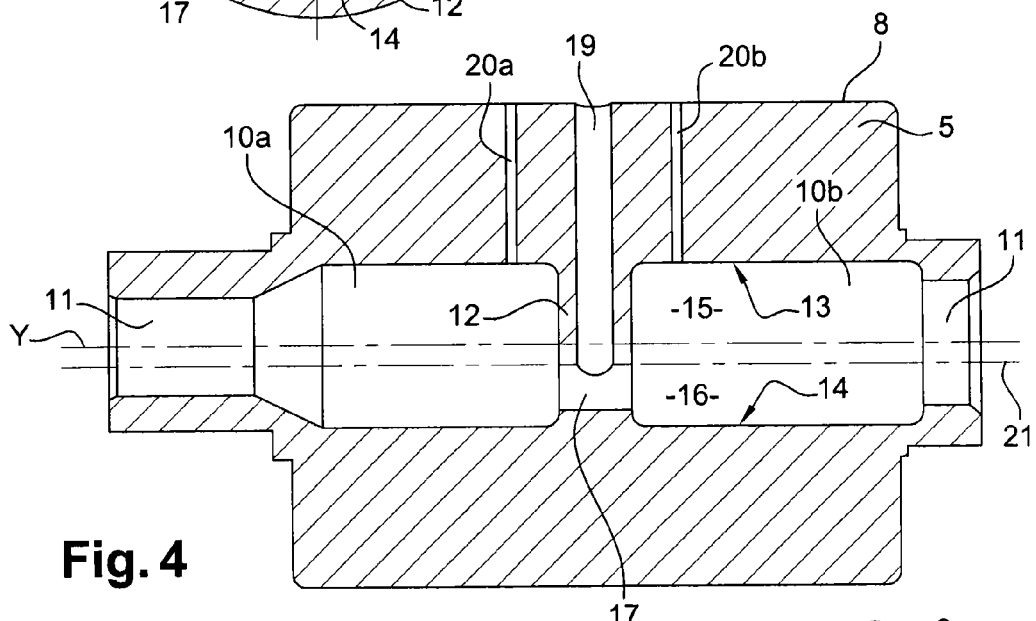
Fig. 4
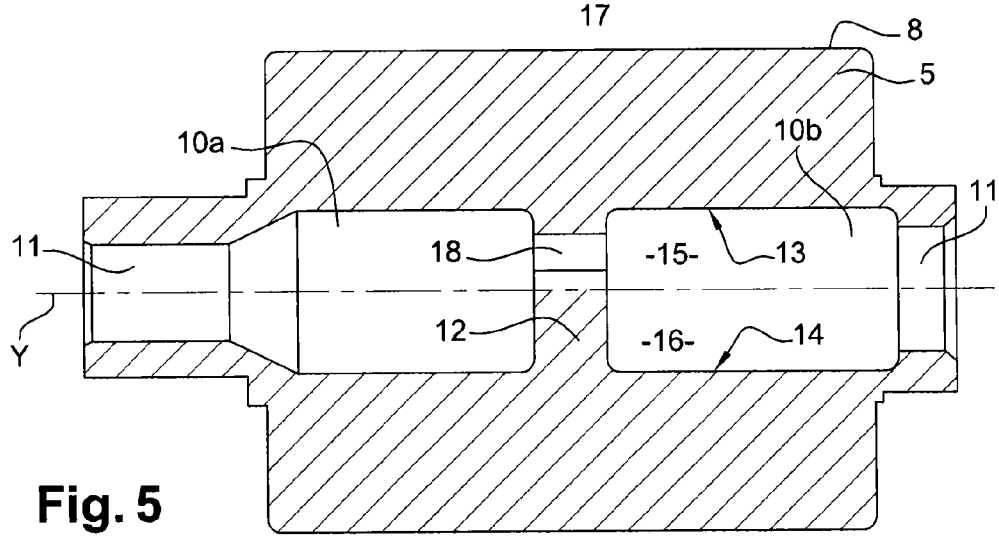
Fig. 5

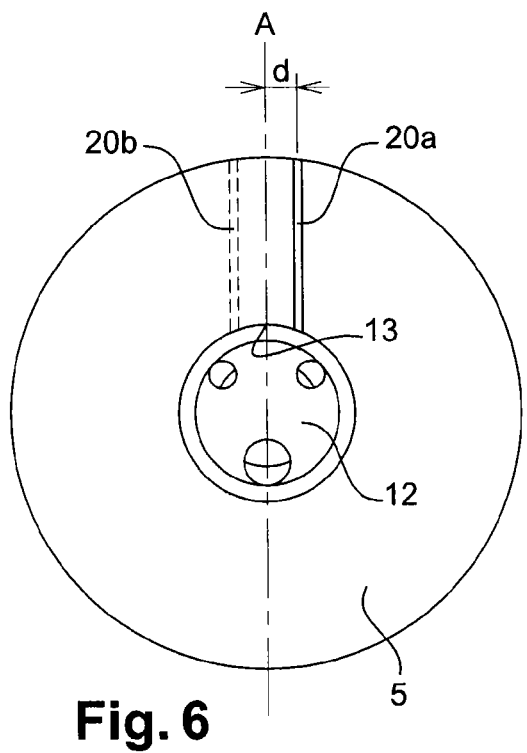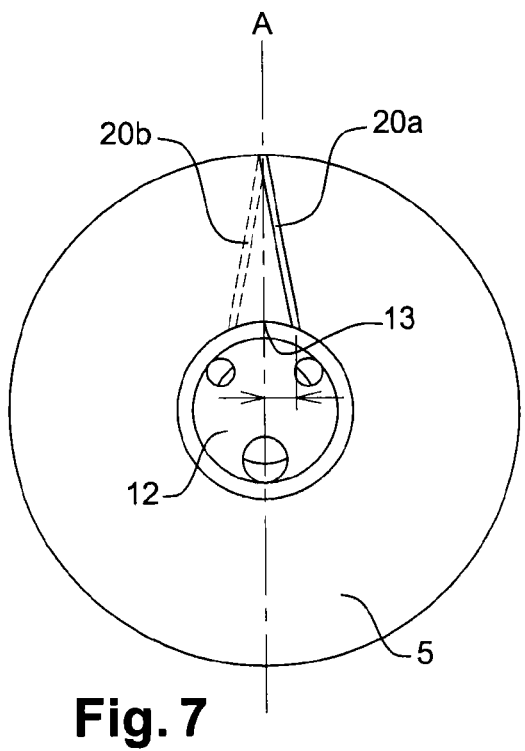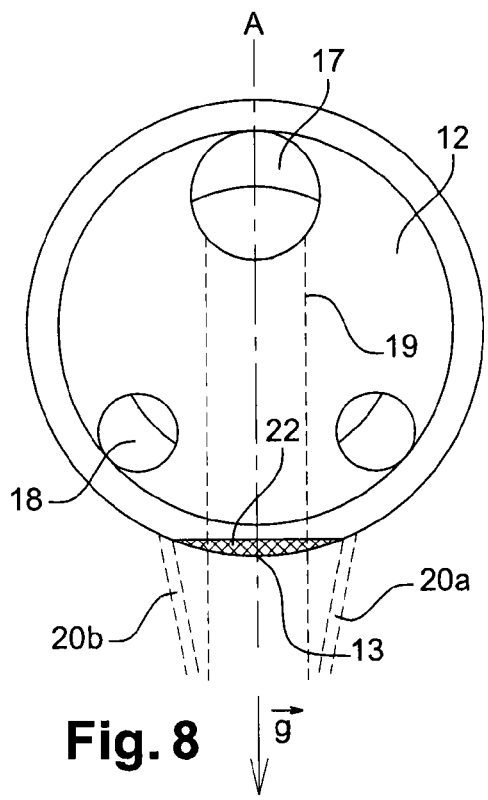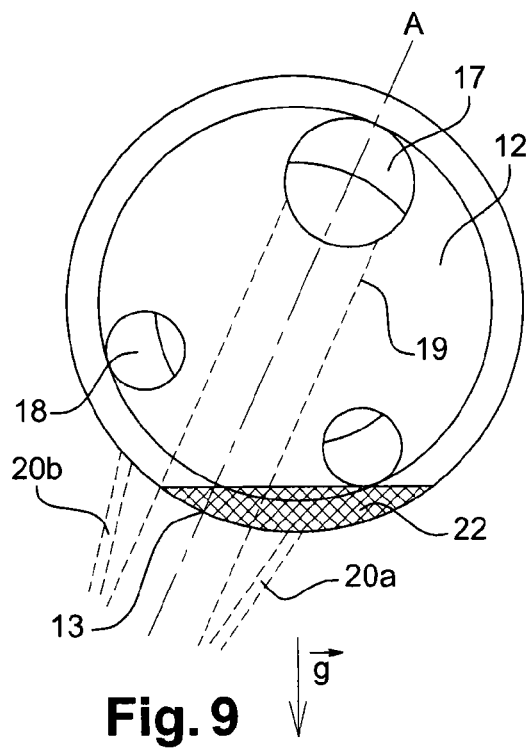

EPICYCLIC REDUCTION GEAR, NOTABLY FOR A TURBOMACHINE

The present invention relates to an epicyclic reduction gear, notably for a turbomachine.

An epicyclic reduction gear conventionally comprises an internal sun gear and an external sun gear which are coaxial, with the internal sun gear being movable in rotation about its axis, with the external sun gear being stationary, with at least one planet gear being mounted to be movable in rotation on a planet carrier and meshing with both the internal sun gear and the external sun gear, with the planet carrier being able to pivot about the axis of the internal sun gear and the external sun gear. The inlet is typically formed by the internal sun gear, also called "sun" and the outlet is formed by the planet carrier. The outer planet is also called an orbit gear.

In a turbomachine, epicyclic reduction gears are used in particular as speed reducers for reducing the speed of rotation of the fan rotor, regardless of the rotational speed of the turbine.

The document EP 1 703 174 describes such an epicyclic reduction gear, wherein the sprocket wheels forming the planet gears are mounted on pivots of the planet carrier by means of journal bearings. In other words, the planet carrier comprises cylindrical pivots engaged in the cylindrical holes of the planet gears. The reducer further comprises an oil supply passage opening at the interface between said cylindrical surfaces. In operation, a layer of oil must be present at the interface, in order to prevent seizing.

The journal bearings are globally less heavy, less bulky and more reliable than bearings using rolling elements. Their service life is almost infinite, so long as they are continuously supplied with oil and the oil includes no abrasive particle.

In case of failure in the oil supply circuit, for example in case a pump failure, the oil supply to the journal bearing must be maintained long enough to start an auxiliary pump or to stop the turbomachine, for example. This period amounts, for example to several tens of seconds.

For this purpose, the document EP 1 703 174 provides for the forming of accumulators in the planet carrier, with each accumulator being able to supply oil to a journal bearing in case of failure, for a given duration.

The structure of such accumulators and the locations thereof make the production of the planet carrier difficult and increase the dimensions and the mass thereof.

The invention more particularly aims at providing a simple, efficient and cost-effective solution to this problem.

For this purpose, it provides an epicyclic reduction gear, particularly for a turbomachine, comprising an internal sun gear and an external sun gear, which are coaxial, with the internal sun gear being movable in rotation about its axis, with the external sun gear being stationary, with at least one planet gear being mounted to be movable in rotation on a planet carrier and meshing with both the internal sun gear and the external sun gear, with the planet carrier being able to pivot about the axis of the internal sun gear and the external sun gear, with the planet gear having a cylindrical inner surface mounted to be movable in rotation around a cylindrical surface of the planet carrier, with the reduction gear further comprising means for supplying oil to the interface between said cylindrical surfaces, characterized in that the oil supplying means comprises a chamber provided in the planet carrier, intended to form a buffer volume of oil, and having a so-called lower zone spaced from the axis of rotation of the planet carrier, a so-called upper zone close to the axis of rotation of the planet carrier, at least one main passage opening at said interface and at the upper zone, and at least one secondary passage opening at said interface and at the lower zone.

In operation, under the effect of a centrifugal force, the oil present in the chamber is forced radially outward. The chamber provided in the planet carrier therefore fills in the lower area spaced from the axis of rotation of the planet carrier first, and then in the upper area.

In normal operation, i.e. in the absence of failure in the oil supplying circuit, the oil flow which enters the chamber is high and the oil level thus reaches the upper area of said chamber. The oil can then escape through the main passage to supply the journal bearing, i.e. the interface between the cylindrical surfaces of the planet carrier and of the planet gear.

It should be noted that, given its size, the secondary passage will not let the whole oil flow through, so that, in normal operation, the chamber fills.

In case of failure, the flow of oil that enters the chamber becomes null and the volume of oil in the chamber decreases and no longer reaches the upper area: the oil can no longer escape through the main passage, but only through the secondary passage. The oil flow feeding the journal bearing is thus reduced, but is sufficient to prevent seizing of the bearing for a limited period of time necessary for example for starting an auxiliary pump or stopping the turbomachine (degraded operation of the journal bearing).

According to one characteristic of the invention, the chamber is substantially cylindrical.

The section of the secondary passage is preferably smaller than the section of the main passage.

Such sections are determined on the basis of the oil flow rate required for the normal operation of the journal bearing and the degraded operation thereof.

According to one embodiment of the invention, the chamber comprises at least two parts which are axially shifted relative to each other and connected together by at least one communication hole opening at the lower zone of each part of the chamber.

In this case, the two parts of the chamber may be separated by a partition wall which comprises a hole connecting both parts and opens at the upper zone of each part, with the main passage opening in said hole.

According to another characteristic of the invention, the secondary passage opens in the chamber at a point radially away from the lowest point of the chamber.

When particles are released in the chamber, during operation, they are centrifuged at the lowest point of the chamber, i.e. at the furthest point from the axis of rotation of the planet carrier. As the opening of the secondary passage is shifted relative to the lowest point, no particle is brought to the journal bearing or clogs the secondary passage.

According to one embodiment of the invention, the secondary passage opens in the chamber at a zone protruding relative to the inner wall of the chamber.

The reduction gear advantageously comprises at least two secondary passages, opening on either side of a radial plane going through the axis of rotation of the planet carrier, at points radially away from the lowest point of the chamber.

Each secondary passage preferably opens in a part of the chamber.

With the machine stopped and whatever the position of the planet carrier, the two parts of the chamber thus cannot be simultaneously emptied by gravity. When restarting the machine, an (even small) amount of oil is thus available to supply the journal bearing.

Besides, the chamber may thus comprise a groove provided in the lower zone of the chamber, with said groove comprising at least an upper zone and at least a lower zone axially spaced from each other, with the lower zone of the groove being radially further away from the axis of rotation of the planet carrier than the upper zone of the groove, with said lower zone of the groove being axially away from the opening of the secondary passage in the chamber.

The groove thus forms a particle trap which makes it possible, in operation, to trap and send the particles away from the opening of the secondary passage. As a matter of fact, in operation, the particles are first trapped in the groove by centrifugation, and then they are gradually brought (still by centrifugation) to the lowest zone of the groove, i;e. to a point sufficiently away from the opening of the secondary passage. Thus, in case of stoppage and then restarting of the machine, the particles are again trapped in the groove before reaching the secondary passage and clogging of the secondary passage is thus avoided.

The invention will be better understood, and other details, features and advantages of the invention will appear upon reading the following description given by way of a non restrictive example while referring to the appended drawings wherein.

Figure 10:
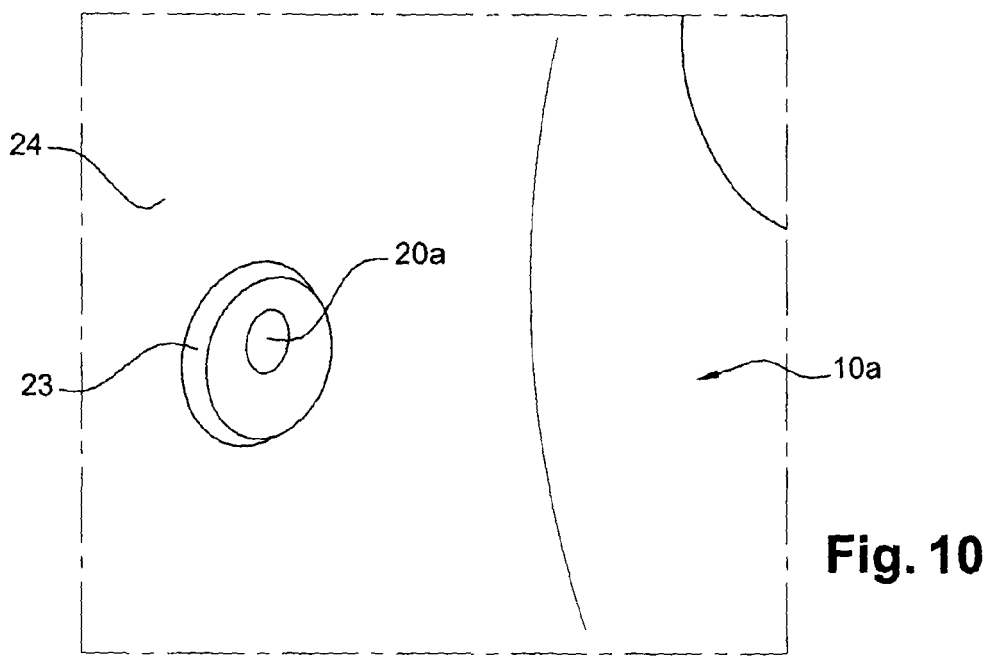
Figure 11:
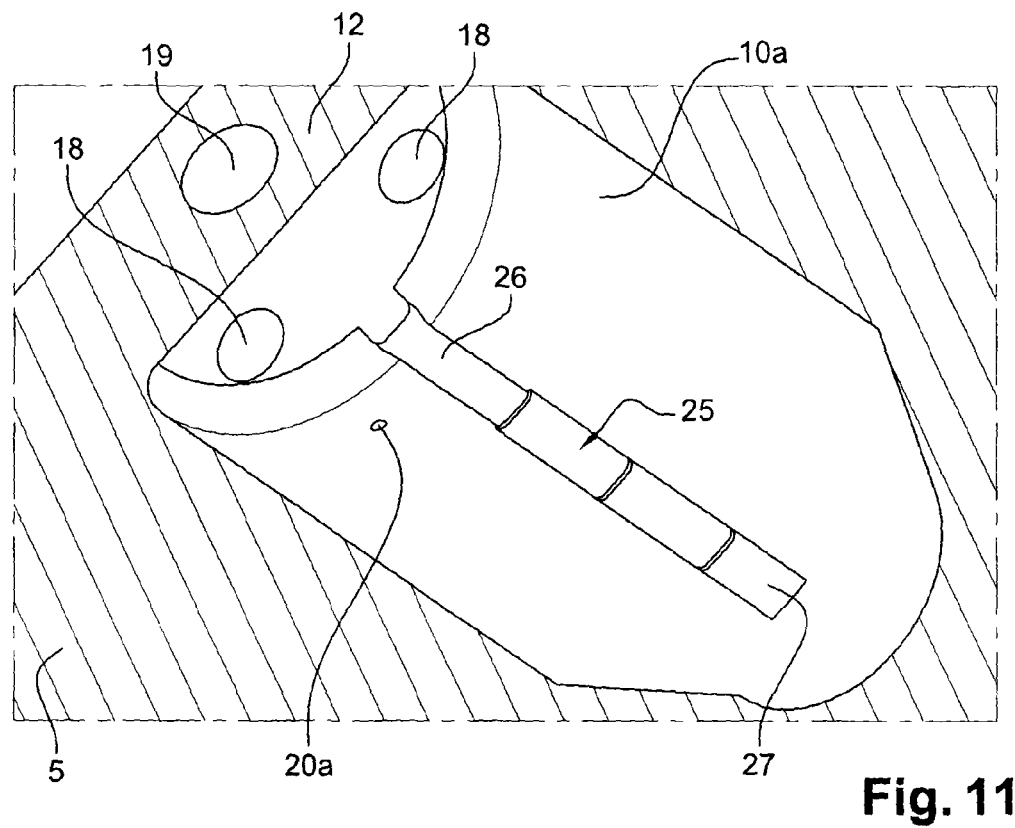

FIG. 3 is a cross-sectional view of a portion of a planet carrier and a planet gear of a reduction gear according to the invention, FIGS. 4 and 5 are views in longitudinal section of a part of the planet carrier, respectively along lines A and B of FIG. 3, FIGS. 6 and 7 are views substantially corresponding to FIG. 3, and illustrate two other embodiments of the invention, FIGS. 8 and 9 are views schematically illustrating the positions of the secondary passages and the residual volume of oil in the chamber, in two different stopping positions of the planet carrier, FIG. 10 is a perspective view of a part of the chamber which comprises a protruding zone at which a secondary passage opens, FIG. 11 is a perspective view in longitudinal section of a part of the chamber comprising a groove used for trapping particles.

Figure 1:
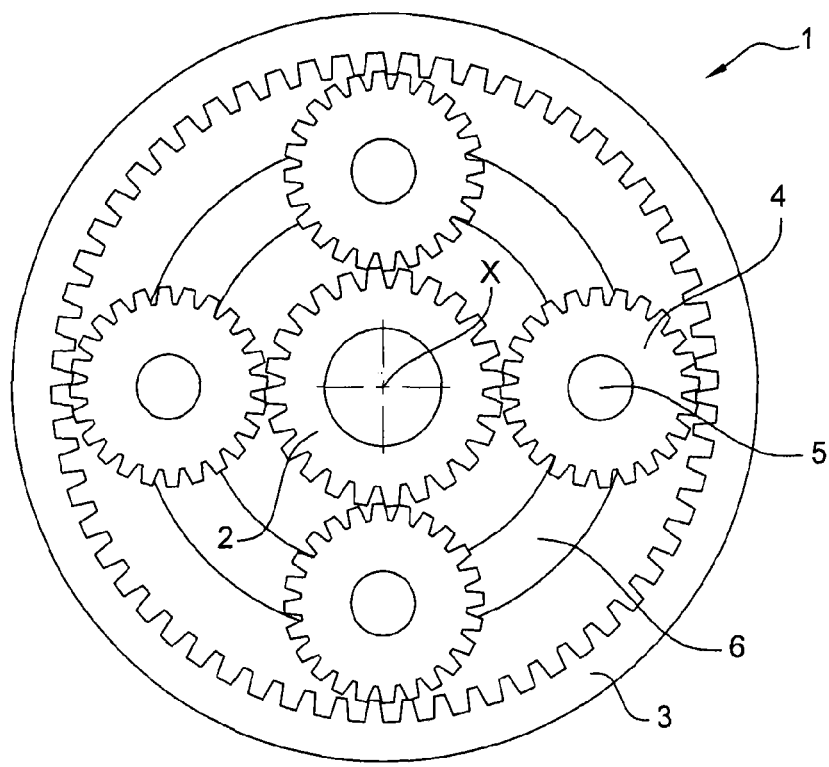
FIG. 1 is a schematic front view of an epicyclic gear.
Figure 2:
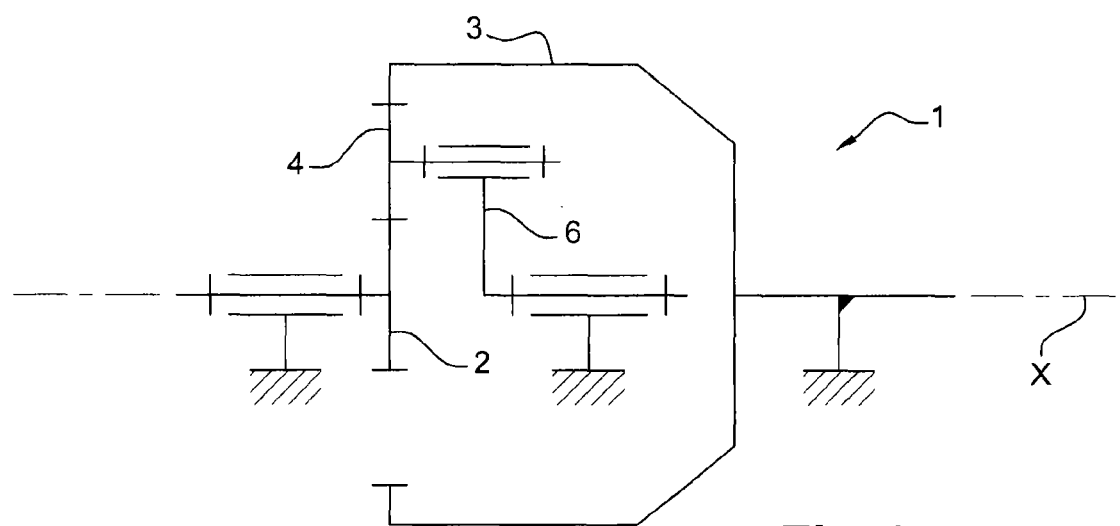
FIG. 2 is a kinematic diagram of an epicyclic gear.

FIGS. 1 and 2 schematically illustrate the structure of an epicyclic reduction gear 1 according to the invention. The latter conventionally comprises an internal sun gear 2 (also called the sun) and an external sun gear 3 (also called an orbit gear) which are coaxial. The internal sun gear 2 is movable in rotation about its axis, with the external sun gear 3 being stationary. The reduction gear further comprises planet gears 4 mounted to be movable in rotation on pivots 5 of a planet carrier 6. Each planet gear 4 meshes with both the internal sun gear 2 and with the external sun gear 3. The planet carrier 6 is able to pivot about the axis X of the internal sun gear 2 and the external sun gear 3.

The inlet is formed by the internal sun gear 2 and the outlet is formed by the planet carrier 6.

In a turbomachine, epicyclic reduction gears are used in particular as speed reducers for reducing the speed of rotation of the fan rotor, regardless of the rotational speed of the turbine. As best seen in FIGS. 3 to 5, each planet gear 4 includes a cylindrical inner surface 7 mounted to pivot about a cylindrical surface 8 of the pivot 5 corresponding to the planet carrier 6 so as to form a journal bearing.

The interface 9 between the two cylindrical surfaces 7, 8 therefore must be supplied with oil. For this purpose, the reducer 1 comprises supplying means comprising a chamber 10 which substantially extends along the Y axis of each pivot 5, with at least one of the ends 11 of the chamber 10 being connected to an oil inlet passage. If only one of the ends 11 forms an oil inlet, the other end is plugged.

The chamber 10 is globally cylindrical and more particularly comprises two parts 10a, 10b separated by a central partition wall 12 which extends radially. The side ends 11 of the chamber 10 are provided with holes having a smaller diameter than the chamber 10, with at least one such hole forming an oil inlet, as indicated above.

The line bearing reference number 13 forms the so-called lower point of the chamber 10, i.e. the furthest point away from the axis of rotation of the planet carrier 6. Conversely, the line bearing reference number 14 forms the so-called upper point of the chamber 10, i.e., the closest point to the X axis of rotation of the planet carrier 6. Similarly, the so-called upper and lower areas bear reference numbers 15 and 16 respectively. The X axis lies in the A section plane of FIG. 3 but is not visible in FIGS. 3 to 5.

In operation, under the effect of the centrifugal force generated by the rotation of the planet carrier 6, oil is pushed radially outwardly back into the chamber 10. Therefore the lower area 15 of the chamber 10 fills first, and then the upper area 16.

A hole 17 opening into the upper areas 16 of the portions 10a, 10b of the chamber 10 goes through the central wall 12. Two holes 18 opening in the lower areas 15 of the portions 10a, 10b of the chamber 10 further go through the central wall 12. The holes 18 are located on either side of the A plane of FIG. 3, i.e. on either side of the radial plane passing through the X axis of rotation of the planet carrier 6 and through the Y axis of the chamber 10 and of the corresponding pivot 5. The diameter of each hole 18 may be smaller than the diameter of the hole 17

A main passage 19 extends radially into the central partition wall 12 and opens at the outer cylindrical wall 8 of the pivot 5 and the hole 17.

In the embodiment of FIGS. 3 to 5, each portion 10a, 10b of the chamber 10 further comprises a secondary passage 20a, 20b which extends radially and opens at the outer cylindrical wall 8 of the pivot 5 and opens at the lower point 13 of the corresponding part 10a, 10b of the chamber 10.

The section of each secondary passage 20a, 20b is smaller than the section of the main passage 19. For instance, the diameter of the main passage 19 is approximately 5 mm and the diameter of each secondary passage 20a, 20b is approximately 0.5 mm.

In normal operation, oil enters the chamber 10 at a sufficient rate for the oil level to be located in the upper area 16 of the chamber 10. The oil volume is equal in both parts 10a, 10b of the chamber 10, due to the holes 18 and through the hole 17.

Oil then enters the main passage 19 and is supplied to the interface 9 by centrifugation.

The section of the main passage 19 is sized so as to obtain, at the interface 9, an oil film the thickness of which corresponds to the specifications imposed or calculated to obtain a correct operation of the journal bearing and avoid any seizing phenomenon.

In case of failure of the lubrication system, the oil volume rapidly decreases until it reaches the level bearing reference number 21 in FIG. 3, from which oil can no longer enter the main passage 19, through the hole 17. From that moment, oil cannot escape (under the effect of centrifugation) but through the secondary passages 20a, 20b. During this phase of degraded operation, a sufficient oil rate reaches the interface 9 via the secondary passages 20a, 20b, so as to prevent seizing of the journal bearing for a given period, for example of the order of 30 seconds. This period must be sufficient to enable for example restarting an auxiliary pump or stopping the engine. The sections of the secondary passages 20a, 20b are thus so determined as to allow such a degraded mode for the desired time.

FIG. 6 illustrates another embodiment, wherein each secondary passage 20a, 20b extends in parallel to the above-mentioned A plane and is spaced from such plane by a distance d. This enables each secondary passage 20a, 20b to open in the corresponding part 10a, 10b of the chamber 10, at a point radially and inwardly shifted relative to the lowest point 13. Besides, the secondary passages 20a, 20b are positioned on either side of the A plane.

In an alternative solution shown in FIG. 7, the secondary passages 20a, 20b may be slant relative to the A plane, so that each secondary passage 20a, 20b opens in the chamber 10 at a point radially and inwardly shifted relative to the lowest point 13 and also opens at the cylindrical surface 8 along the A plane. In this case too, the secondary passages 20a, 20b are positioned on either side of the A plane.

The embodiments illustrated in FIGS. 6 and 7 make it possible to avoid particles clogging the secondary passages 20a, 20b or being brought to the journal bearing. As a matter of fact, when particles are released in the chamber 10, during operation, they are centrifuged at the lowest point 13 of the chamber 10, i.e. at the furthest point from the X axis of rotation of the planet carrier 6. As the openings of the secondary passages 20a, 20b are shifted relative to the lowest point 13, the particles cannot go into, or clog, the secondary passages 20a, 20b.

FIGS. 8 and 9 schematically illustrate a chamber 10 according to the embodiment shown in FIG. 6, in two different stopping positions of the planet carrier 6.

In the case shown in FIG. 8, the A plane is oriented according to the gravitational field, shown by the g vector. The oil 22 still remaining in the chamber falls into the lower zone by gravitation. Oil can then escape through the secondary passages 20a, 20b, but a volume of oil 22 remains in each chamber 10 because of the shifting of the openings of the secondary passages 20a, 20b and the lowest point 13.

Such volume of oil 22 thus can, during a subsequent phase of restarting, enter the secondary passages 20a, 20b and lubricate the journal bearing before oil is supplied into the chamber 10.

In another case, shown in FIG. 9, the A plane is slant relative to the direction of the g gravitational field. More particularly, oil 22 falls back into a zone, the bottom of which comprises the opening of one of the secondary passages 20a, 20b, i.e the passage 20a. In this case, oil is emptied from one 10a of the parts of the chamber 10 and escapes through such secondary passage 20a, whereas the other part 10b of the chamber 10 still contains a volume of oil 22. As before, in case of restarting, such volume of oil 22 may circulate from one part to the other, through the holes 18, enter the secondary passages 20a, 20b and lubricate the journal bearing before oil is supplied into the chamber 10. It should be noted that the volume of oil 22 present in the chamber 10 in the case shown in FIG. 9 is bigger than in the case shown in FIG. 8.

FIG. 10 also illustrates another embodiment wherein each secondary passage 20a, 20b opens in the chamber 10 at a zone 23 protruding relative to the inner wall 24 of the chamber, so as to prevent, as above-mentioned, particles from entering or clogging the secondary passages 20a, 20b.

Another type of particle trap is shown in FIG. 11. In such embodiment, each part 10a, 10b of the chamber 10 comprises a groove 25 provided in the lower zone 15 of the chamber 10, with said groove 25 comprising at least an upper zone 26 and at least a lower zone 27 axially spaced from each other, with the lower zone 27 of the groove 25 being radially further away from the axis of rotation X of the planet carrier 6 than the upper zone 26 of the groove 25, with said lower zone 27 of the groove 25 being axially away from the opening of the secondary passage 20a, 20b in the chamber 10. The groove 25 more particularly comprises successive stages enabling passage from the upper zone 26 to the lower zone 27 thereof.

The groove 25 thus forms a particle trap which makes it possible, in operation, to trap and send the particles away from the opening of the corresponding secondary passage 20a, 20b. As a matter of fact, in operation, the particles are first trapped in the groove 25 by centrifugation, and then they are gradually brought (still by centrifugation) to the lowest zone 27 of the groove 25, i;e. to a point sufficiently away from the opening of the secondary passage 20a, 20b. Thus, even in case of stoppage and then restarting of the machine, the particles are again trapped in the groove 25 before reaching the secondary passage 20a, 20b. All risks of clogging the secondary passage 20a, 20b are thus avoided.

The invention thus provides an epicyclic reduction gear comprising journal bearing provided with reliable and small-sized oil supplying means, which are adapted to supply a sufficient oil flow rated for a determined period of time, in case of failure of the oil circuit.

The invention claimed is:

1. An epicyclic reduction gear, or for a turbomachine, comprising:
    an internal sun gear and an external sun gear, which are coaxial, with the internal sun gear being movable in rotation about its axis, with the external sun gear being stationary;
    at least one planet gear mounted to be movable in rotation on a planet carrier and meshing with both the internal sun gear and the external sun gear, the planet carrier configured to pivot about the axis of the internal sun gear and the external sun gear, the planet gear having a cylindrical inner surface mounted to be movable in rotation around a cylindrical surface of the planet carrier;
    means for supplying oil at an interface between the cylindrical surfaces, wherein the oil supplying means comprises a chamber provided in the planet carrier, configured to form a buffer volume of oil, and including a lower zone spaced from the axis of rotation of the planet carrier, an upper zone close to the axis of rotation of the planet carrier, at least one main passage opening at the interface and at the upper zone, and at least one secondary passage opening at the interface and at the lower zone.

2. A reduction gear according to claim 1, wherein the chamber is substantially cylindrical.

3. A reduction gear according to claim 1, wherein the section of the secondary passage is smaller than the section of the main passage.

4. A reduction gear according to claim 1, wherein the chamber comprises at least two parts which are axially shifted relative to each other and connected together by at least one communication hole opening at the lower zone of each part of the chamber.

5. A reduction gear according to claim 4, wherein the two parts of the chamber are separated by a partition wall which comprises a hole connecting both parts and opens at the upper zone of each part, with the main passage opening in the hole.

6. A reduction gear according to claim 1, wherein the secondary passage opens in the chamber at a point radially away from a lowest point of the chamber.

7. A reduction gear according to claim 6, wherein the secondary passage opens in the chamber at a zone protruding relative to an inner wall of the chamber.

8. A reduction gear according to claim 1, comprising at least two secondary passages, opening on either side of a radial plane going through the axis of rotation of the planet carrier, at points radially away from a lowest point of the chamber.

9. A reduction gear according to claim 8, wherein each secondary passage opens in a part of the chamber.

10. A reduction gear according to claim 1, wherein the chamber comprises a groove provided in the lower zone of the chamber, with the groove comprising at least an upper zone and at least a lower zone axially spaced from each other, with the lower zone of the groove being radially further away from the axis of rotation of the planet carrier than the upper zone of the groove, with the lower zone of the groove being axially away from the opening of the secondary passage in the chamber.

* * * * *